UNITED STATES PATENT OFFICE.

JOHN A. HOPE, OF MONTREAL, QUEBEC, CANADA.

WELDING COMPOSITION.

1,209,841. Specification of Letters Patent. Patented Dec. 26, 1916.

No Drawing. Application filed April 10, 1916. Serial No. 90,252.

*To all whom it may concern:*

Be it known that I, JOHN ALEXANDER HOPE, of the city of Montreal, in the Province of Quebec, Dominion of Canada, have invented new and useful Improvements in Welding Compositions; and I do hereby declare that the following is a full, clear, and exact description thereof.

My invention relates particularly to the welding of a cutting edge of high speed steel to a low carbon steel shank; and has for its object to enable a perfect weld to be obtained without the necessity of any separate processes for rehardening the edge after the weld.

The invention may be said briefly to consist of a welding composition comprising ferro-manganese, ferro-silicon and burnt borax in the following proportions: 80% ferro-manganese 60 parts, 50% ferro-silicon 20 parts, burnt borax 20 parts. These ingredients are in granular or pulverulent form and they are mixed cold and dry in any suitable vibratory receptacle.

The manner in which I use my composition is as follows: I first pre-heat both the low carbon steel shank and the high-speed steel edge member to approximately 1500° Fahrenheit in a closed coke furnace, and this temperature is maintained for a sufficient time to thoroughly heat the parts. About three minutes is necessary for comparatively small cutting tools such as are used in lathes. The parts are then withdrawn and while hot the faces to be welded have the welding mixture applied thereto. The faces are then brought together and the article put in the press and there subjected to a light pressure, approximately 300 pounds for about half a minute. This pressure is varied according to the area of the face to be welded, the larger the face the greater the pressure. The tool is then removed from the press, the edge member being lightly attached to the shank, and the welding composition evenly distributed and closely packed between the faces. The tool is then given its final heating in the same furnace, a forced blast being used and the temperature raised to the welding point, the white heat, say, for instance, with comparatively small tools from 2100° to 2500°. This temperature causes the mixture between the faces to flow and when the flux is completed the tool is again withdrawn from the furnace and returned to the press where it is subjected to a final pressure of from approximately 200 pounds to 1000 pounds according to the size of the tool and the area of the face being welded, and this pressure is maintained until all working of the fluxed composition ceases. A perfect weld is thus obtained. The tool is then removed from the press and the high-speed steel face is immediately subjected to a cold air blast, thus giving to the cutting edge the required hardness to do any work required of high-speed steel cutting tools.

In the welding of very small tool parts with small faces to be welded the proportion of ferro-manganese may be reduced without departing from the spirit of my invention.

I have found that my welding compositions when used with my process secure a perfect bond between the high-speed steel edge and low carbon steel shank, and actual test has proved that the welded joint offers greater resistance to breakage than either the high-speed steel itself or the low grade steel.

What I claim is as follows:—

1. A high-speed steel and low carbon iron welding composition consisting of 80% ferro-manganese, 60 parts; 50% ferro-silicon, 20 parts; and burnt borax 20 parts.

2. A high-speed steel and low carbon iron welding composition consisting of ferro-manganese, ferro-silicon and burnt borax.

In testimony whereof I have signed my name to this specification in the presence of two witnesses.

JOHN A. HOPE.

Witnesses:
  WILLIAM HEWETSON,
  GORDON G. COOKE.